US006822187B1

(12) United States Patent
Hermann et al.

(10) Patent No.: US 6,822,187 B1
(45) Date of Patent: Nov. 23, 2004

(54) ROBOTICALLY OPERATED LASER HEAD

(75) Inventors: Gerald F. Hermann, Westland, MI (US); Mark S. Leybzun, Commerce, MI (US)

(73) Assignee: GSI Lumonics Corporation, Billerica, MA (US)

( * ) Notice: Subject to any disclaimer, the term of this patent is extended or adjusted under 35 U.S.C. 154(b) by 0 days.

(21) Appl. No.: 09/786,979

(22) PCT Filed: Sep. 9, 1999

(86) PCT No.: PCT/US99/20820
§ 371 (c)(1),
(2), (4) Date: Jun. 4, 2001

(87) PCT Pub. No.: WO00/54925
PCT Pub. Date: Sep. 21, 2000

Related U.S. Application Data
(60) Provisional application No. 60/099,547, filed on Sep. 9, 1998.

(51) Int. Cl.[7] .................... B23K 26/00; B23K 26/14; B23K 26/16
(52) U.S. Cl. .................. 219/121.63; 219/121.64; 219/121.67; 219/121.74; 219/121.75
(58) Field of Search .............. 219/121.6–121.69, 219/121.7–121.76, 121.83, 121.85; 356/613, 614; 29/720

(56) References Cited
U.S. PATENT DOCUMENTS

| 4,316,467 A | | 2/1982 | Muckerheide | |
| 4,324,972 A | * | 4/1982 | Furrer et al. | 219/121.63 |
| 4,578,554 A | * | 3/1986 | Coulter | 219/121.63 |
| 4,618,758 A | * | 10/1986 | Gilli et al. | 219/121.67 |
| 4,668,088 A | | 5/1987 | Quinque et al. | |
| 4,676,002 A | * | 6/1987 | Slocum | 33/1 MP |
| 4,682,594 A | | 7/1987 | Mok | |

(List continued on next page.)

FOREIGN PATENT DOCUMENTS

| FR | 2 689 254 | | 10/1993 |
| GB | 2153785 A | * | 8/1985 |
| JP | 402235012 A | | 9/1990 |
| JP | 10-128571 A | * | 5/1998 |

OTHER PUBLICATIONS

"Interlocking Anti–Crash and Conveyor Indexing Control Card for High–Speed Substrate Testers", IBM Technical Disclosure Bulletin, Jul. 1990, vol. 33, Issue 2, pp. 31–34. IBM TDB–ACC–NO: NN600731.*

*Primary Examiner*—L. Edmondson
(74) *Attorney, Agent, or Firm*—Brooks Kushman P.C.

(57) ABSTRACT

A laser cutting or welding device, the device having a laser head (10) and a robot (35), wherein the laser head is attached to the robot (35). The laser head (10) has a housing (12), a focal lens (26) disposed within the housing and a light source (18) in optical communication with the focal lens (26). The housing (12) has a nozzle with a tip (90), the tip having an exit port (17). The laser head (10) has means (33) for adjusting a light path of a light beam directed from the light source onto a focal optic to center a focusing beam formed by the focal optic coaxial with the tip. In one aspect hereof, the laser device has a crash avoidance system.

21 Claims, 5 Drawing Sheets

U.S. PATENT DOCUMENTS

| | | | | |
|---|---|---|---|---|
| 4,707,596 A | | 11/1987 | Hohberg | |
| 4,760,583 A | * | 7/1988 | Sasnett et al. | 372/109 |
| 4,812,641 A | | 3/1989 | Ortiz, Jr. | |
| 4,845,354 A | | 7/1989 | Gupta et al. | |
| 4,855,565 A | * | 8/1989 | Thomas et al. | 219/121.74 |
| 4,892,992 A | * | 1/1990 | Akeel et al. | 219/121.78 |
| 5,293,023 A | * | 3/1994 | Haruta et al. | 219/121.6 |
| 5,304,773 A | * | 4/1994 | Kilian et al. | 219/121.78 |
| 5,340,962 A | | 8/1994 | Schmidt et al. | |
| 5,347,454 A | * | 9/1994 | Mushabac | 433/214 |
| 5,428,280 A | * | 6/1995 | Schmidt et al. | 318/568.11 |
| 5,446,549 A | * | 8/1995 | Mazumder et al. | 356/613 |
| 5,491,318 A | | 2/1996 | Sugawara et al. | |
| 5,515,599 A | * | 5/1996 | Best | 29/38 C |
| 5,592,294 A | * | 1/1997 | Ota et al. | 192/85 R |
| 5,698,120 A | | 12/1997 | Kurosawa et al. | |
| 5,718,832 A | | 2/1998 | Mori | |
| 5,734,146 A | | 3/1998 | La Rocca | |
| 5,756,962 A | | 5/1998 | James et al. | |
| 5,760,368 A | | 6/1998 | Nakata | |
| 5,763,855 A | | 6/1998 | Shioji | |
| 5,786,561 A | | 7/1998 | Zefferer et al. | |
| 5,961,858 A | * | 10/1999 | Britnell | 219/121.63 |
| 6,316,743 B1 | * | 11/2001 | Nagahori et al. | 219/121.67 |
| 6,392,192 B1 | * | 5/2002 | Cole et al. | 219/121.62 |

* cited by examiner

ROBOTICALLY OPERATED LASER HEAD

CROSS-REFERENCE TO RELATED APPLICATIONS

This application claims the benefit of a co-pending, prior filed U.S. provisional application Ser. No. 60/099,547 entitled "Laser Cutting-Head with Adjustable Light Source, Crash Avoidance System and Improved Gas Delivery System" filed Sep. 9, 1998, the disclosure of which is herein incorporated by reference.

BACKGROUND OF THE INVENTION

I. Field of the Invention

The present invention pertains to robotically operated laser cutting and welding devices. More particularly, the present invention pertains to a robotically controlled laser cutting or welding head that operates about the surface of a three dimensional workpiece.

II. Prior Art

Present-day laser cutting or welding devices typically have a light source that directs light to one or more mirrors and lenses which in turn directs the light to a focal or condenser optic. The light source may be an optic fiber. The mirror and lenses or optics of the laser device are typically housed in a laser head. The laser head has a housing with a nozzle through which a laser beam is directed to impinge upon a workpiece. The operation or motion of the laser head about a workpiece may be controlled by a robot and controller or the like.

Robotically controlled laser devices are often operated under rugged conditions. The devices are subjected to jarring, bumping and vibrations. Continual use under these conditions often results in the light beam being other than optimally aligned on the laser optics.

Centering the light beam on the laser optics is important where light converges from the focal lens through the nozzle onto a work piece to deliver large amounts of energy. A focal lens is often used to concentrate such light from the light source into a powerful beam to cut or weld various materials. The most intense part of the beam is the apex or focal spot. The apex or focal spot impinges upon a workpiece to perform much of the laser operation. It is therefor necessary to maintain an optimal portion of the incoming light beam upon the focal lens to thereby maximize the operation of the focal spot upon a workpiece.

Additionally, replacement of the light source is not uncommon. Once a new light source is installed, the light beam is typically aligned upon each mirror or lens in the optic system. Care must be taken not to significantly alter the optimal path length of light diverging from the light source to avoid diminishing the intensity of the concentrated laser beam. Care must also be exercised to direct the concentrated light beam through the nozzle of the laser head. Thus, the installation of a new light source is often time consuming, laborious, and requires considerable care.

Realignment of the optics in many present day laser heads mandates that the head be dismantled and each mirror or lens be individually adjusted. Laser cutting operations may not be performed in the cleanest environments. Thus, the laser head must be removed from the operation site to a clean location so that the laser optics can be adjusted in a contamination free environment. The realignment process, like the installation process, is also time-consuming, laborious and requires considerable care so as not to contaminate the optics with dirt and dust.

Some laser heads provide a way to realign the laser beam by adjusting the focal or condenser lens. In such laser heads, a mechanism for adjusting the condenser lens is disposed near or at the nozzle. A laser head having a mechanism for adjusting the condenser lens is disadvantageous for a number of reasons. One such reason is that the mechanism for adjusting the condenser lens results is a laser head having a bulky housing and nozzle. The bulky housing and nozzle is particularly disadvantageous where the laser head must be manipulated about the surface of a three-dimensional workpiece having varying topography.

Furthermore, assist or make-up gases, such as oxygen, are used with lasers to increase the laser's cutting efficiency and for removing debris from the cutting surface. The assist gas is typically delivered from the nozzle of the laser head to the surface of a workpiece. The gas may be delivered to the nozzle via an external, loose tube or hose connected to a gas source. The gas delivery tubes of present day laser heads are deficient for a number of reasons including the fact that they create a point or place for a workpiece to catch upon. Additionally, these tubes frequently wear out or become damaged as a result of their external positioning next the laser head, thus requiring repeated replacement.

As is generally known to the skilled artisan, present day laser heads can be operated by a robot. The robot controls the pattern and distance the laser head operates about the surface of a workpiece.

The surface topography of a workpiece can vary considerably. Similarly, the thickness of a workpiece can also vary considerably. As a result, it has been a long-standing problem to have collisions between the laser head and a workpiece or a surrounding fixture that may damage either the laser head or the workpiece. To further complicate the problem, workpieces are often cut in batch during industrial operations. As a robot moves the laser head from workpiece to workpiece collisions may occur due to the misplacement of the workpiece within a support structure.

One attempt to overcome the problem of collisions has been to provide present day laser heads with breaker switches or micro switches that open to stop the robot after a laser head has collided with a workpiece. The force required to open the breaker switch may be a force sufficient to disconnect the laser head from the robot. This force can be sufficient to damage the laser head, optics or the robot.

Therefore, it is to be appreciated from the preceding that present day robotically operated laser heads are deficient in providing for precise manipulation about a three-dimensional workpiece having varying topography for a number of reasons. For example, present day laser heads require a bulky housing to accommodate present day optics and their support structures. Further, present day laser heads are typically fitted with an external assist gas delivery system that may catch upon a workpiece or fixture and may succumb to accelerated wear.

It is also to be appreciated from the preceding that present day robotically operated laser heads fail to provide a suitable means for adjusting the optical path of a light source upon a condenser optic to focus a laser beam through a nozzle of the laser head.

It is also to be appreciated from the preceding that present day robotically operated laser heads fail to provide an effective, yet durable, way of delivering an assist gas to the nozzle of a laser head.

It is also to be appreciated from the preceding that present day, robotically operated laser devices having a laser head attached to a robot are deficient in providing an effective means of avoiding a collision with a workpiece so as not to substantially disconnect the laser head from the robot attached thereto.

SUMMARY OF THE INVENTION

As discussed hereinbelow, the present invention, to address the above stated problems and others, as is detailed hereinafter, enables an improved laser head for manipulation about a three-dimensional workpiece having varying topography. The present invention also provides an improved laser device having means for avoiding a collision with a workpiece by stopping the robot and laser head operation before damage to the laser head or robot occurs.

The laser head hereof has: a housing; a nozzle attached to the housing at a distal end thereof, the nozzle forming a tip, a light source which produces a light beam supported by the housing; at least one focal optic for receiving the light beam and focusing the light beam into a high density laser beam through the nozzle, means for adjusting the light path of the light beam from the light source within the housing onto the focal optic wherein the means for adjusting is adapted to center the focusing beam coaxial with the tip, and means for adjusting the means for receiving the light beam.

The laser head may further include means for delivering an assist gas from inside the housing, through the nozzle to the cutting surface of a workpiece. Also, the laser head may further comprise means for determining the proximity of the laser head to a workpiece.

By delivering an assist gas from within the housing and placing the means for adjusting the means for receiving the light beam within a top portion of the housing, the nozzle and the laser head may be formed with a more streamlined design. By making the housing and the nozzle more streamlined, the laser head can be operated more precisely about the surface of a three-dimensional workpiece.

The present invention also provides means for avoiding a collision between a laser head and a workpiece. Robotic operation of the laser head may be performed in several modes. The modes of operation may be determined by either the proximity of the laser head to a surface of a work piece or the operating condition of the robotic unit or both. The modes of operation may include, for example, an operation or run mode, a park mode, a teach mode, and a hold mode. The modes of operation may further be controlled by the operating condition of the laser head, for instance, whether the laser head is operating at an extended or a retracted limit.

In use the laser head is mounted to a robot or robotic arm, which together, function as a laser device that may operate upon a surface of a workpiece in one or more of the above mentioned modes. The laser device has means for determining if the laser head is in contact with or in close proximity to the surface of the workpiece. Depending upon the mode of operation that the laser device is functioning in, the device, particularly the robot operation, will cease to operate when the laser head is at a predetermined distance from a workpiece. Thus, by prohibiting the device from operating in certain modes when the laser head is positioned above a surface of a workpiece at a certain distance, the present invention provides a crash avoidance system whereby the laser head is less likely to be involved in a crash with a workpiece to prevent damage and other problems that may therefor follow.

The laser head hereof may be telescopable. In operation, the telescopable laser head retracts and extends to follow the surface of a workpiece and to correct for minor deviations therein. The crash avoidance system provides means for stopping the laser head and robot or the laser device when the telescopable laser head reaches an extended limit or a retracted limit.

The laser head will typically reach an extended limit when the laser head is fully telescoped and positioned at a maximum distance from a work piece such that the laser head can not extend further to accommodate the distance from a workpiece that the laser head is operating at. Even though the laser head is not likely to be involved in a collision with a work piece at this distance, such distance is likely to result in inferior use of the laser. Therefore, the robot is better shut down or stopped then left to continued operation about a workpiece.

The laser head reaches a retracted limit when the laser head moves so close to a workpiece that the laser head may no longer retract within itself. The laser head may reach a retracted limit for a number of reasons, for example as a result of operating programming which does not coincide with the variations among surface topography between workpieces. If a laser head is left to operate at a retracted limit, the laser beam may not optimally impinge upon the surface of the workpiece. Additionally, the laser head will be more prone to crashing when operating at a retracted limit. Therefore, the robot and laser head are preferably stopped until adjustments, such as reprogramming the robot or repositioning the work piece, may be preformed.

For a more complete understanding of the present invention, reference is made to the following detailed description and accompanying drawings. In the drawings like reference characters refer to like parts throughout the several views.

DESCRIPTION OF THE PREFERRED EMBODIMENTS

At the outset, it is to be noted that the present invention is particularly suited for use in solid material cutting or welding, such as in metal cutting, sheet metal cutting, welding, lap welding or for the car manufacturing industry in general, etc., although other uses therefor will become apparent to the skilled artisan from the ensuing disclosure.

Figure 1:
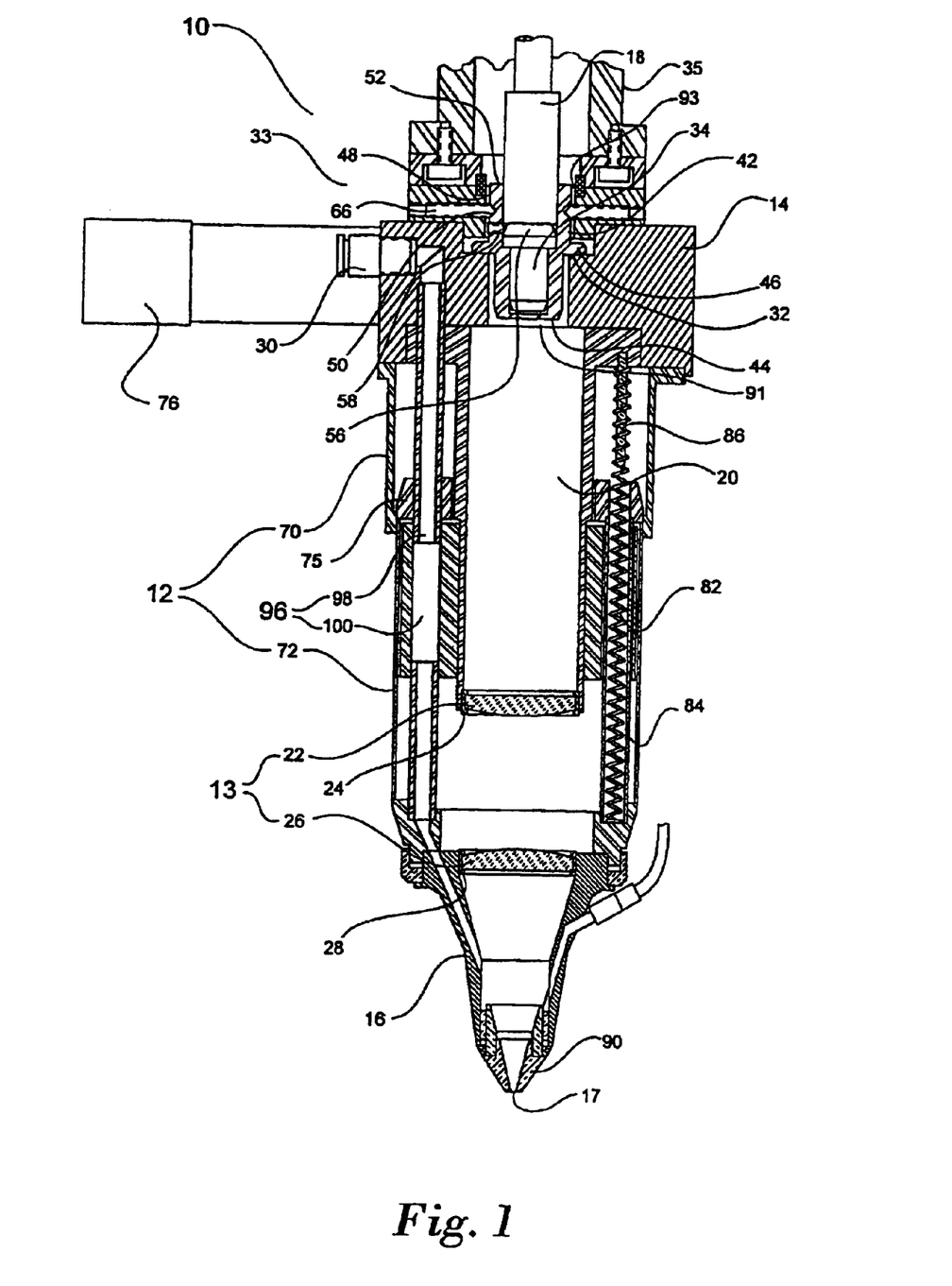
FIG. 1 is a cross-sectional side view of a first embodiment of a laser head in accordance herewith.
Figure 2:
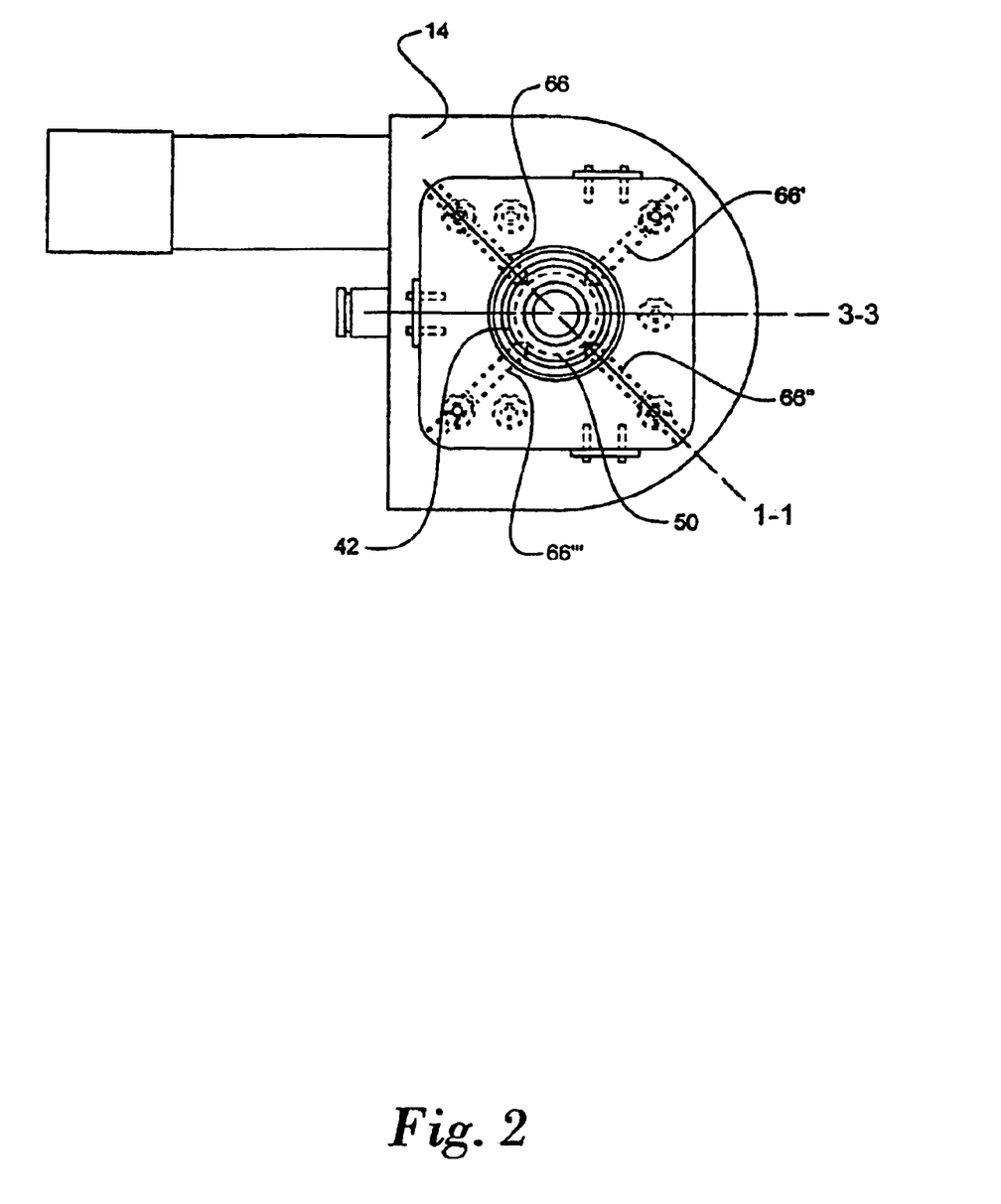
FIG. 2 is a cross-sectional top view of the laser head hereof taken along line 3—3 of FIG. 3 and line 1—1 of FIG. 1.
Figure 3:
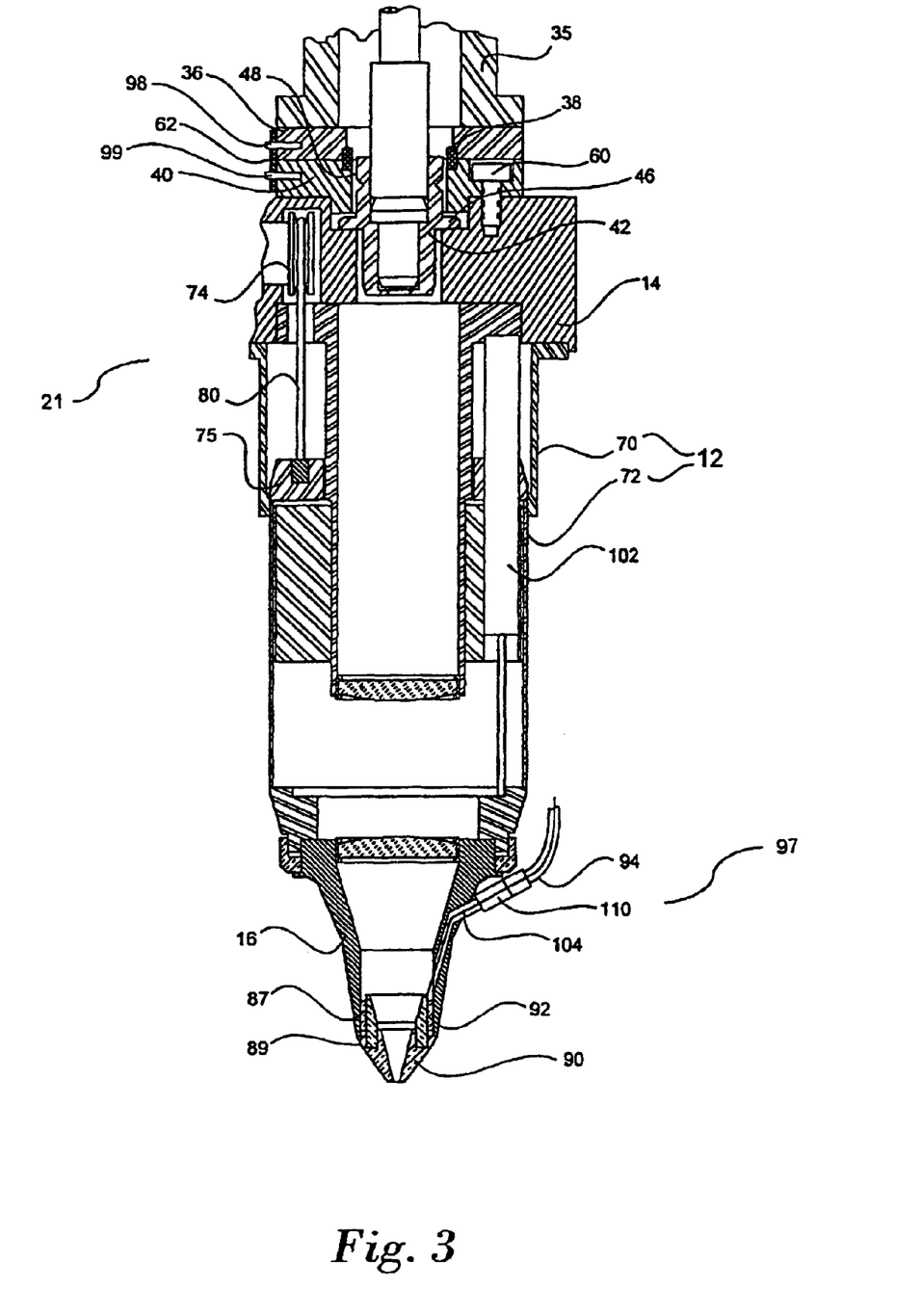
FIG. 3 is a second cross-sectional side view of the laser head in accordance with the present invention.

Now referring to FIGS. 1, 2 and 3, a laser head 10 in accordance with the present invention is depicted therein as including a housing 12 containing laser optics 13. The housing 12 forms a hollow inner chamber 20 to provide a light path and to protect the optics 13 from particulates and abrasion during any laser cutting or welding operation. The housing 12, at a first end thereof, is connected to a mounting block 14 by conventional means, such as fasteners or the like. The mounting block 14 may be formed separate from the housing 12 or made integral therewith. The mounting block 14 provides a suitable attachment member for securing various components or the laser head thereto. The housing 12 tapers down at a second end to a nozzle 16. Alternatively, the nozzle 16 may be attached to the second end using suitable fastening means. The nozzle 16 further tapers down to tip 90 having an exit or nozzle port 17 to provide a laser head that can direct assist gases and prevent debris or spatter from operation upon a workpiece from entering the nozzle 16.

In a preferred embodiment, the nozzle 16 is an extended tubular member that is narrower than the housing 12. Such a nozzle may have a first tapering conical portion followed by a second tapering portion, which also extends longitudinally to provide an extended member. The second tapering portion is then followed by a third conical tapering portion that terminates at a tip. The extended, narrower tubular nozzle provides a laser head capable of precisely operating about a three dimensional workpiece.

A light source 18 is connected to the mounting block 14 and is in optical communication with the hollow inner chamber 20 of the housing 12. The light source 18 provides a light beam for the laser head. The light source 18 can be any suitable laser light beam generating means, for example, an optical fiber or the like. The light source 18 is adapted to shine a beam of light through a chamber in the mounting block 14 and is adjustably connected thereto, as discussed below.

The light source 18 generates and directs the light beam upon the laser optics 13 or means for receiving the light beam. The means for receiving may be any type of receiving optic, including a lens, mirror, prism, beam splitter, etc. As shown, the means for receiving the light beam comprises a first or receiving lens 22 disposed within the hollow inner chamber 20 of the housing 12. The receiving lens 22 may be a collimating lens. The receiving lens 22 provides means for delivering a suitable light beam to a second or focal lens 26. As shown, the receiving lens 22 is supported within the inner chamber 20 of the housing 12, at the end opposite the mounting block 14, by a first lens cartridge 24. The second lens 26 is supported inside the housing proximate a top portion of the nozzle 16 by a second lens cartridge 28. The second lens 26 is in optical communication with the first lens and may receive a collimated light beam from the first lens 22 to focus the light beam through the nozzle 16 onto a workpiece.

The laser head 10, hereof, further includes means for adjusting the incoming light beam upon a first receiving optic or the like, which is generally depicted at 33. As shown, the means 33 for adjusting the incoming light beam includes a fiber adapter 42 adjustably seated within the mounting block 14. The means 33 for adjusting the incoming light beam upon the first receiving optic provides for directing or centering the incoming light beam upon a desired light path. The desired light path is, for instance, an optical path in line with the focal or condensing lens 26. Thus, upon operation of the means 33 for adjusting, the incoming light beam can be directed upon the focal lens 26 in a manner suitable for delivering an amount of light to the focal lens 26 sufficient for forming a high-powered laser beam. The means 33 for adjusting also permits the focal point of a laser beam to be centered coaxial with the nozzle port 17 or hole without moving the focusing lens or the nozzle.

The means 33 for adjusting may comprise a fiber adapter 42. The fiber adapter provides means for adjustably supporting an optical fiber. As shown, the fiber adapter 42 is a hollow member having an outer wall 48 for supporting an optical fiber within the mounting block 14. The outer wall 48 is adapted to extend into the mounting block 14 and terminate at a tip 44 of the fiber adapter 42. The tip 44 has a central opening or is open at a first end for directing light from the optical fiber there through. A support ridge 46 extends circumferencially from the outer wall 48 to slidably support the fiber adapter 42 upon a ledge or shelf 32 of the mounting block 14. The outer wall 48 longitudinally extends beyond the support ridge 46 where the wall 48 has at least one notch 50 circumferencially disposed thereabout. The notch 50 is used to secure or fix the position of the fiber adapter 42 within the mounting block 14. The wall 48 terminates at a second open end 52. The second open end 52 is adapted to receive an optical fiber there through.

An optic or optical fiber 34 is seated in the fiber adapter 42 and extends to approximately the tip 44 of the fiber adapter 42. The optical fiber 34 is secured or removably fixed within the fiber adapter 42 using any suitable fastening means, for example, a screw 58 impinging upon a tapered portion 56. The use of the optical fiber 34 for producing a light beam is generally known and includes any type of long, thin thread of fused silica, or other transparent material used to transmit light.

The mounting block 14 provides a support for the fiber adapter 42 and a mechanism to shear upon the occurrence of a violent or uncontrolled crash between the laser head and a workpiece or other fixture. The mounting block 14 has a first throughbore 91 and a second bore 93 concentric therewith, the bores 91, 93 cooperate to form a ledge 32. The fiber adapter 42 has a ridge 46 adapted to set upon the ledge 32 of the mounting block 14. The second bore 93 has a radius substantially greater than both the ridge 46 of the fiber adapter and the first bore 91 of the mounting block 14. The fiber adapter 42 is disposed tip 44 first in the first throughbore 91 of the mounting block such that the ridge 46 of the fiber adapter contacts the ledge 32 of the mounting block and is translatable or is slidably seated thereon. Thus, the fiber adapter 42 is adapted to translate or slidably move upon the ledge 32. The slidability or translation of the fiber adapter 42 provides for adjustment of the light beam upon the focal lens 26 to center the focused laser beam through the tip 90 of the nozzle 16.

The mounting block 14, may also provide a support to attach the laser head to a robot 35 (shown in part). The laser head may be attached to the robot 35 using any suitable fastening means, such as magnetic attachment, break-away tabs, etc. The fastening means preferably provides a safety release mechanism, which disconnects the laser head from the robot upon a violent or uncontrolled collision.

As shown in FIG. 3, the mounting block is a two piece structure that acts as a safety relief mechanism adapted to shear upon the laser head uncontrollably colliding with another object to separate the laser head containing the optics from the robot 35. The safety relief mechanism comprises an upper break-away flange 36 and a lower break away flange 40. The upper break-away flange 36 is secured to the robot 35 using suitable fastening means, such as screws, bolts or the like. The lower break-away flange 40 is secured to the mounting block 14 using suitable fastening means, such as a screw 60, bolt or the like. The lower break-away flange is secured to the upper break-away flange by a suitable break-away means. The break-away means is effected by at least one break-away plate 62 and a plurality of pins 98, 99 connecting the upper break-away flange 36 to the lower break-away flange 40. A break-away ring 38 is disposed between the upper and lower break-away flanges to provide means for aligning the flanges. The break-away ring 38 conforms to the inner shape of the upper and lower flanges and rests upon the lower flange to effectuate the alignment.

The break-away plate 62 may be formed of any material that provides a suitable shearing mechanism to disconnect the upper flange 36 from the lower flange in the event of an uncontrolled collision between the laser head and a workpiece or other object to thereby separate the laser head from the robot 35. Such a mechanism protects the robot and the laser head from major damage should a collision be unavoidable.

The lower break-away flange 40 has a bore with a radius substantially wider than the outer wall 48 of the fiber adapter 42 to allow for unrestricted movement of the fiber adapter 42. As discussed below, movement of the fiber adapter 42 may be restricted by one or more fasteners.

Referring now to FIG. 2, the fiber adapter 42 is adjustably attached to the mounting block 14 with a plurality of fasteners 66, 66', 66", 66"'. Preferably the fiber adapter 42 is adjustably mounted within the mounting block with at least three fasteners, and preferably four fasteners, diametrically disposed radially about the lower break-away flange and contacting the notch 50 of the fiber adapter 42. As shown in FIG. 1, a screw 66 mounted through the lower break-away flange 40 contacts the notch 50 in the outer wall 48. The screw 66 cooperates with at least one other screw to restrict the slidable movement of the fiber adapter 42 about a horizontal or a x-y axis.

The plurality of fasteners 66, 66', 66", 66"' are equally distanced around the fiber adapter 42. Adjustment of the light beam is accomplished by loosening specific fasteners 66, 66', 66", 66"' followed by the tightening of other fasteners 66, 66', 66", 66"' whereby the optic fiber or the fiber adapter 42 may be incrementally moved. This movement of the optic fiber, in turn moves the light beam emitted from the light source to incrementally alter the light path of the beam along the x-y axis of the laser head. When the correct position of the light beam is reached, all fasteners 66, 66', 66", 66"' are re-tightened.

In use, the laser head travels along a surface of a workpiece at a predetermined speed. As the present invention contemplates, the laser head is adapted to operate upon a three dimensional surface having varying topography. Such a laser head is adapted to continuously alter the position or distance that the tip 90 or nozzle 16 of the laser head operates at in relation to the changing surface topography of the workpiece.

A laser head adapted to continuously alter the operating height is now described in a preferred embodiment. The housing 12 in this preferred embodiment is a telescopable two-part assembly comprising a first body or upper eye-induced tube 70 and a second body or lower tube 72 retractable and extendable into and out of the first body 70.

The telescopable housing 70, 72 provides a laser head that may precisely track the surface of a workpiece in relation to the changing topography of said surface. The telescopable housing also provides an improved or faster means for adjusting the distance or height that the laser head operates at above a workpiece as compared to a laser head adjusted solely by a robot or robotic arm.

The first and second bodies 70, 72 may be formed of any suitable material, including stainless steel, brass, alloys, ceramics, etc. Suitable materials are resistant to wear and heat and provide adequate support for the optics. The bodies 70, 72 are preferably rigid, cylindrical structures that are sized to fit one within the other. The telescopable housing thereby provides a housing less prone to wear, as opposed to for example, an accordion or a flexible housing design.

The laser head, as shown in FIG. 3, includes means 21 for continuously adjusting the distance or height that the nozzle or laser head operates at above the surface of a workpiece. The means 21 for continuously adjusting is any suitable device for extending and contracting the housing within itself or the mounting block. Such means may include one or more of the following, for example, an electric motor, rack and pinion, hydraulic means, pulley and cable, opposing springs, etc.

As shown, the means 21 for adjusting includes a motor 76, a flange 75, a pulley 74, a cable 80, and at least one spring 82 that are connected to drive the telescopable housing. As stated above, the lower tube or second body 72 has an outer diameter smaller than the upper tube or first body 70 and is telescopable therein. The flange 75 is connected to or made integral with the top of the lower tube 72. The pulley 74 having a cable 80 associated with it is rotatably mounted within the mounting block 14. The cable 80 is wound upon the pulley 74 with one end extending through the mounting block 14 and connected to the flange 75. The motor 76 is mounted to the mounting block and is functionally connected to the pulley 74. The motor 76 is controlled electronically through a controller (not shown). The motor 76 provides rotational motion to the pulley 74 for winding and unwinding the cable 80 about the pulley 74. The cable 80 in turn moves the flange 75 and the corresponding lower tube 72 into the upper tube 70.

As shown in FIG. 1, a spring 82 and is seated between the upper tube 70 and the lower tube 72 and acts to oppose the retraction of the lower tube 72 within the upper tube 70, thereby opposing the motion of the pulley 74. As shown, the spring 82 is supported at one end by the lower tube 72 with a spring shield 84. The opposite end of the spring 82 is attached to the mounting block 14 at a spring post 86. Operation of the pulley 74 to wind the cable 80 retracts the lower tube 72 within the upper tube 70. Likewise but in a reverse manner, operation of the pulley 74 to unwind the cable 80 extends the lower tube 72 from the upper tube 70.

The laser head may further include means for determining the distance the laser head is positioned at above a surface of a workpiece. The means for determining may be any suitable distance sensing device or means, including but not limited to various electrical devices, capacitive sensing, laser reflection, variable resistance sensors, a linear potentiometer, etc. As shown, the means for determining is means 97 for capacitive sensing. The means 97 for capacitive sensing includes an electrically conductive tip 90 disposed at the free or distal end of the nozzle 16 and a capacitive sensing cable 94 (shown in part) attached thereto.

As shown, the nozzle 16 is connected to the bottom of the lower tube 72 of the housing. The nozzle preferably has an electrically conductive tip 90. The nozzle 16 may be made of any metal or alloy that is conductive and heat resistant. An insulating insert 89 is disposed between the tip 90 and the rest of the nozzle or housing. The insert prohibits undesirable electric current from traveling through the nozzle or tip to the housing. The tip 90 is connected to the nozzle 16 with a conductive threaded insert 87. The insert 87 also provides a connection from the tip 90 to the capacitive sensing cable 94.

Thus, the tip 90 is in electrical communication with a capacitive sensing cable 94. The capacitive sensing cable 94 has an inner conductive core 104. The inner conductive core 104 is surrounded by an insulated outer coating or dielectric 110. The capacitive sensing cable may be connected to the tip 90 in any suitable manner, such as spot welding, fasteners, etc. The inner conductive core 104 is a conductive metal, such as copper, silver, etc. A second insert 92 may be used to separate the tip 90 from the nozzle 16. As with the first insert above, the second insert 92 prohibits undesirable electric current from traveling through the nozzle to the housing.

In use, an electric charge is applied to the insulative tip 90 through the capacitive sensing cable 94, whereby an electrical discharge to the workpiece in relation to the distance from the tip 90 occurs. The electrical discharge is measured or monitored by a controller or any other suitable device (not shown), such as a PLC, computer analogue to digital converter, analogue electrical circuit, etc. The controller may also operate to keep the distance between the tip 90 and the workpiece constant, such as by controlling the motor 76 operation. As will be discussed below, the controller may also be used as part of a crash avoidance system.

Operation of the motor 76 is controlled by a controller (not shown), such as a PLC, electric circuit, computer or the like which may have a program. The controller determines the motor 76 operation by processing signals sent from a potentiometer 102, means 97 for capacitive sensing or the like. As shown the potentiometer 102 is disposed between the mounting block 14 and the lower tube 72. The potentiometer 102 is electronically connected to the controller. The potentiometer 102 senses the amount of compression/retraction the housing has undergone and sends an electronic signal to the controller. The signals may then be processed with any suitable device, for example, an A/D converter, computer software loaded into the computer, etc. The signals are then used to determine the extension/retraction the housing has undergone.

The laser head may also include an assist gas delivery system, wherein the system, preferably, is disposed within the housing and adapted to deliver an assist gas to the nozzle 16. As shown, the assist gas delivery system is a telescopable, two-part conduit 96 which extends along the inside of the housing 12 through the mounting block 14 and is connected to a gas inlet connector 30. The gas inlet connector 30 is mounted to the top of the mounting block 14 and extends into the housing 12. The gas inlet connector 30 is connected to the conduit 96 disposed within the housing 12 by any suitable fastening means. The conduit 96 runs the length of the housing 12 tapering at the nozzle 16. The conduit 96 has a rigid inner tube 98 collapsible into a rigid outer tube 100, wherein the outer tube 100 has an inner diameter greater than that of the outer diameter of the inner tube 98, thereby allowing the conduit 96 to retract/extend within itself. The retractable, extendable gas assist delivery system provides a durable way to deliver an assist gas to the nozzle and provides a laser head more capable of operating about a three dimensional surface.

In a preferred embodiment, the laser head and robot form a laser unit having a crash avoidance system. The crash avoidance system includes means for determining the operating mode of the laser head; means for determining the distance the laser head is operating at above a surface of a workpiece; and means for stopping the operation of the laser unit to avoid a collision when the laser head is detected at a predetermined distance above a surface of a workpiece.

Figure 5:
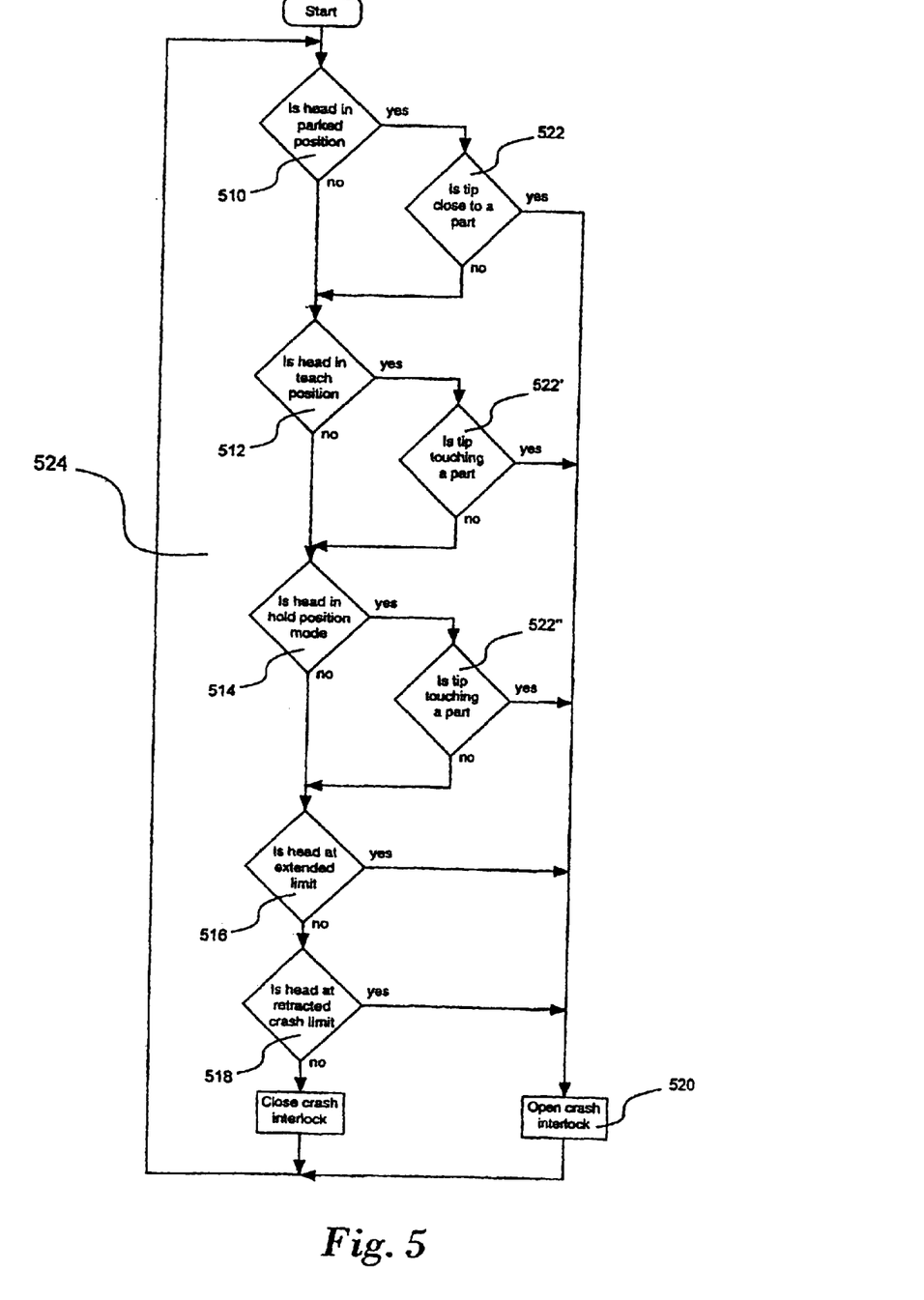
FIG. 5 is a flow chart of a preferred method of crash avoidance of a robotically operated laser head in accordance with the present invention.

Referring now to FIG. 5, shown therein is a flow chart depicting the operation of a crash avoidance system in accordance with the present invention generally shown at 524. Operation of the laser head and robot is performed as a unit. The unit may be operated in several different modes. The modes of operation may be determined by either the position of the laser head about a workpiece or by an operating condition of the robot or by both. The modes of operation may include, for example, an operating or run mode, a park mode 510, a teach mode 512, and a hold mode 514.

Each mode of operation may be a discrete operating mode. The run mode is the actual operation of the unit. The park mode 510 is a mode of operation where the unit is in a standing or latent position. The teach mode 512 is a mode of operation where the unit masks or traces the desired motions and actions of operation in order to program the unit. The hold mode 514 is a mode of operation where the unit operates upon a portion of a workpiece at an edge or hole of the workpiece. During operation, the laser head normally tracks the surface of a workpiece by rising and falling therewith. Rather than having the height of the laser head drop dramatically upon reaching an edge or hole in the workpiece, in the hold mode 514 the laser head maintains it's current operating axis or height irrespective of the surface it is operating upon to properly perform the laser operation.

The means 522 for determining the distance the laser head is operating at above a surface of a workpiece is any device or means that allows the approximate space between the distal end of the tip of a laser head and a surface of a workpiece to be measured. The laser head and robot function as a unit which operates upon a surface of a work piece in one or more of the above mentioned modes. The means 522 for determining the distance may be any suitable means or device, such as the means 97 for capacitive sensing or the linear potentiometer 102 as described above. The means 522 for determining may also be either a single device or separate devices 522', 522" for determining the distance.

As mentioned above and shown in FIG. 3, the means 97 for capacitive sensing comprises a nozzle or tip 90 and means for electrically determining if the laser head is in contact with or in close proximity to the surface of the workpiece. Depending upon the mode of operation that the unit is functioning in, the unit will not operate or will cease to operate when the laser head is at a predetermined distance from a work piece. The predetermined distance is normally from 0 mm to about 1 mm and preferably less than 0.5 mm between the laser head and a workpiece. A crash is considered avoided even if the predetermined distance is set to 0 mm as long as damage does not occur to the laser head or robotic unit upon contact. Thus, by prohibiting the unit from operating in certain modes when the laser head is positioned at certain heights or in contact with a workpiece, the present invention provides a laser head less likely to be involved in a crash with a workpiece or damaged, thereby preventing problems that may therefor follow.

The laser head and robot or the unit may further be controlled by the operating condition of the laser head. For instance, operating conditions of the laser head include but are not limited to the laser head reaching an extended limit 516 or a retracted limit 518. As the present invention also provides a laser head that is telescopable or extendable, the crash avoidance system may provide means for stopping the unit when the laser head reaches the extended limit 516 or the retracted limit 518. A laser head will typically reach an extended limit 516 when the laser head is at a maximum distance from a workpiece and the telescoping housing is fully extended. Even though the laser head is not likely to be involved in a collision with a workpiece, such operating condition is likely to result in inferior use of the laser beam.

Therefore, the laser unit is better shut down or left idle for adjustment than left to continued operation on a workpiece.

The laser head reaches a retracted limit 518 when the laser head operates or moves close to or is in such proximity to a workpiece that the telescopable housing of the laser head may no longer retract within itself. A laser head may reach a retracted limit 518 as a result of preprogramming the operation of the laser head, wherein the programming does not coincide with unexpected variations of workpiece surface topography. If a laser head is left to operate at a retracted limit 518, the focused laser beam may not properly impinge upon the surface of the workpiece, or the laser head may be prone to increased collisions. Therefore, the unit is preferably stopped or left idle until adjustment to the unit or reprogramming may be preformed.

For example, as a laser cuts a workpiece, the laser head may operate at about 1 mm from the cutting surface. In movement from workpiece to workpiece, the laser cutting head may momentarily reach a parked position, being as much as 10 mm from the workpiece. As the head then moves from workpiece to workpiece, the means 522 for avoiding a collision detects if the workpiece comes within a 3 mm to 6 mm range of the surface of a work piece and shuts the laser head and robot off before a collision occurs.

The means 520 for stopping the operation of the laser head to avoid a collision when the laser head is detected at a predetermined distance above a surface of a workpiece may be any suitable means or device that stops or prohibits the movement of the laser head and robotic unit when a "crash" condition is met. Suitable devices comprise for example, a controller that receives a signal from a linear potentiometer, the controller in turn sending a signal to open a crash interlock to stop the laser head and the robot. The controller can be any suitable controlling device that may receive a signal and send a signal when a "crash" condition is met. Suitable controlling devices include a PLC, a computer driven by software, a circuit board with a controller chip, an electric circuit, an analogue electric circuit, PROM, etc.

Figure 4:
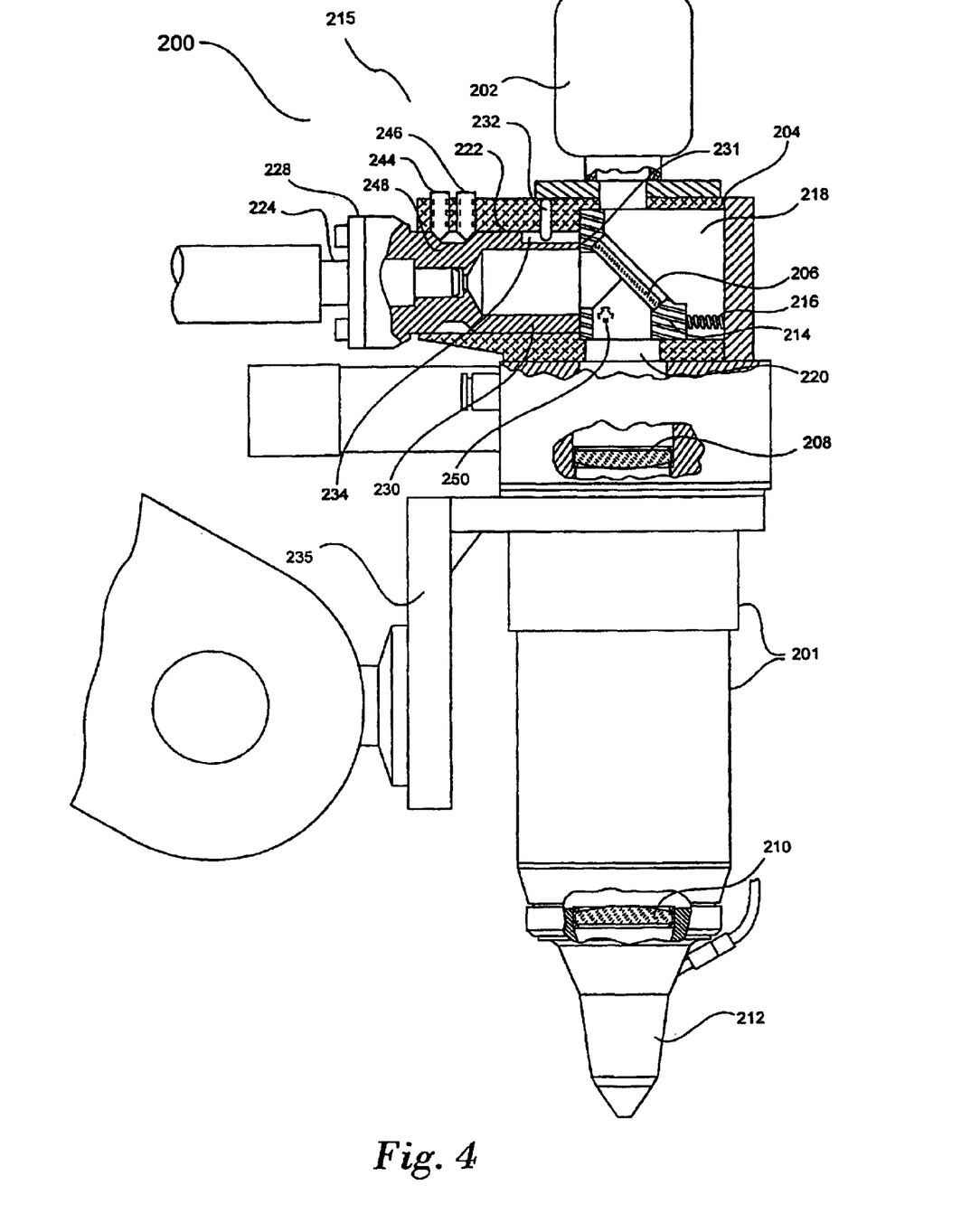
FIG. 4 is a cross-sectional view of a second embodiment of a laser head in accordance with the present invention.

Referring now to FIG. 4, there is depicted therein a second embodiment of the present invention, generally depicted at 200, wherein an optical fiber 224 is connected to a laser head 200 at an angle, preferably normal to the cutting axis. In this embodiment, the laser head comprises a housing 201, an optical fiber 224 and means 215 for adjusting the light path of light beam produced from a light source. As shown, the means 215 for adjusting is an adjustable optic or mirror assembly disposed within the housing 201 for adjusting the incoming light beam along the y-axis of the laser head and a translatable or slidable carriage to adjust the incoming light beam along the x-axis of the laser head.

Positioning the optical fiber 224 at an angle provides for attachment of a camera 202 or other viewing device at the top of a mounting block 204, directly above the focused laser beam. As shown, a receiving mirror 206 or optic is disposed within the housing 201 and is adapted to deflect or bend the incoming light beam onto a first lens 208 to provide a light beam that enters the housing at an angle in relation to the exiting laser beam. The light beam is passed to a second or focal lens 210 from which the light beam is focused through a nozzle 212 onto a workpiece (not shown).

A mounting block 204 in conjunction with the housing 201 is used to fix the laser head to a robot or robotic arm 235 (shown in Part). As shown, the mounting block 204 also provides a suitable support for a light source 224, for optics 208, 206, 210 and for a camera 202. The mounting block 204 has an internal chamber 218; a first hole 220 passing through the bottom of the mounting block which bisects the chamber 218; and a second hole 222 extending from the side of the chamber to a back wall.

The means 215 for adjusting may include an adjustable mirror assembly. As shown, the adjustable mirror assembly is disposed within the mounting block 204. The adjustable mirror assembly includes a mirror 206, a mirror mount 214, and a pair of biased adjustment fasteners 250 (one of which is shown). The mirror 206 is seated on the mirror mount 214 and is rotatably disposed within the internal chamber 218 with the pair of biased adjustment fasteners 250. The fasteners 250 may be any suitable securing members that are adjustable, such as screws, bolts, clips, clamps, etc. As shown, the fasteners 250 are screws extending through the mounting block to adjustably hold the mirror mount 214 in place.

The mirror mount 214 has a machined side to tightly fit against or butt the front surface of a fiber adapter 230. A spring 216 is compressed between the mirror mount 214 and the back of the chamber 218 to keep the mirror mount 214 butted to or pressed against the fiber adapter 230. Butting the mirror mount 214 to the fiber adapter 230 provides an assembly that may translate or slide in unison, yet forms a two piece assembly or a carriage 231 wherein the mirror mount 214 or mirror may independently rotate about an axis.

An optical fiber 224 or other light source is connected to the mounting block by a fiber adapter 230. The optical fiber 224 is attached to the fiber adapter 230 by any suitable means, for example and as shown, a butt plate 228. The optical fiber 224 is positioned to shine a light beam through the second hole 222 to a receiving optic or mirror 206. The mirror 206 is positioned on the mirror mount 214 to form the mirror assembly. The mirror 206 may be of such design as to reflect only desired wavelengths. The mirror 206 is positioned at an angle, preferably about 45 degrees, to provide optical communication between the optical fiber 224 and a first lens 208.

A pair of fasteners, such as adjustment screws 250 (one of which is shown), rotatably support the mirror mount 214 within the mounting block. The adjustment screws 250 extend from the outside of the mounting block 204 to the mirror mount 214. The adjustment screws 250 function to adjust the light beam from the optical fiber 224 along the y-axis of the laser head onto the first lens 208 without changing the length the light beam travels from the optic fiber 224 to the first lens 208.

The carriage 231, as shown, comprises the mirror assembly and the fiber adapter 230, wherein the mirror assembly diametrically opposes the fiber adapter at machined surfaces to form the carriage 231. The carriage 231 is slidably seated in the mounting block 204. A guide pin 232 fixed to the mounting block rides within a guide channel 234 formed in the carriage 231 to prohibit rotational movement of the fiber adapter 230 within the mounting block 204.

The carriage 231 is translatable along an axis of the laser head. Translation of the carriage 231 is limited by any suitable means or fastening device. As shown, a pair of set screws 244, 246 limit the translation of the carriage. The set screws 244, 246 extend through the mounting block 204 to contact a second groove 248 formed on the slidable carriage 231, whereby tightening the set screws fixes the position of the slidable carriage 231.

The set screws 244, 246 operate in a synergist manner to incrementally move the carriage 231 along an axis of the laser head. To incrementally move the carriage, the set screws 244, 246 are seated in a groove of the mounting block wherein the groove 248 terminates on either end at an inclining wall. The screws 244, 246 and groove 248 are adapted to move the carriage along the x-axis when loosening one screw 244 followed by the tightening of the other 246. Moving the carriage along the x-axis thereby moves the optic fiber and mirror mount in unison to reposition the light beam on a lens 208 without changing the length of the light path between the optic fiber 224 and the lens 208.

In practicing the present invention, preferably, the housing 201 is sealed and generally kept under positive pressure to keep the internal components of the housing 201, including optics, dust free. Also, the optical system, preferably, comprises a plurality of lenses such that a first receiving lens 208 or optic directs a parallel or collimated light beam to a second focusing lens 210.

While the invention has been illustrated in detail in the drawings and the foregoing description, the same is to be considered as illustrative and not restrictive in character, it is understood that only the preferred embodiment has been shown and described fully and that all changes and modifications that come within the spirit of the invention are desired to be protected.

Having thus described the above several embodiments of the present invention, what is claimed is:

1. In as laser device of the type having a laser head and a robot, the laser head being mounted to the robot, the laser head having a housing, a focal lens disposed within the housing, a light source in optical communication with the focal lens, a nozzle disposed within the housing, and a nozzle tip disposed within the nozzle having a sensor, the laser device having means for multiple operating modes wherein the improvement comprises:
   means for determining a distance the laser head is operating at above a surface of a workpiece;
   means for determining the position of the laser head at either an extended limit, a retracted limit, or an intermediate position above a workpiece;
   means for stopping the operation of the laser device to avoid damage to the laser device in response to the means for determining when the head is at either the retracted limit, the extended limit, or at the intermediate distance above a surface of a workpiece;
   means for sensing the operating mode of the laser device to determine a method of crash detection comprising the laser head and the nozzle tip sensor cooperating to signal the means for stopping; and
   means for selecting and communicating the method of crash detection to the means for stopping.

2. The laser device of claim 1, wherein the operating mode of the laser device is selected from the group of parked, teach, run or hold.

3. The laser device of claim 1, wherein the means for stopping is operable to stop the laser device when the laser head is positioned between 3 mm to about 6 mm above the surface of the workpiece when the operating mode of the laser device is in the parked mode.

4. The laser device of claim 1, wherein the means for determining the distance the laser head is operating above a surface of a workpiece further comprises means for capacitive sensing.

5. The device of claim 1, wherein the housing comprises a first body portion and a second body portion, the first body portion being telescopable with the second body portion, the first body portion being translatable with the second body portion along a common axis.

6. The device of claim 5, further comprising means for determining the position of the telescopable housing at either an extended limit, a retracted limit, or an intermediate position between the limits.

7. A method of operating a robotic laser material processing device having a robotic member and a laser head, while avoiding defective laser machining of a workpiece caused by an undesirable laser beam impinging on the workpiece of damage caused by a crash between the device and an object including the workpiece, a fixture, or other structure in a path of the device, the method comprising:
   activating, through the use of robotic control program, a first mode of operation so as to control the device during a first time interval when a surface of a workpiece is not being tracked in relation to changing topography of the workpiece, the first mode of operation having an associated crash protection tolerance defined by a predetermined minimum distance between the object and a location of the device;
   measuring a distance of the head relative to a surface of an object to obtain a distance measurement;
   comparing the distance measurement with the predetermined minimum distance;
   generating a signal to communicate a crash condition whenever the distance measurement is less than the predetermined minimum;
   detecting, during the operation of the unit in the mode, a position of the laser head relative to a travel limit; and
   generating, based upon the detected position relative to a limit, a signal to communicating a crash condition so that the operation of the unit is stopped if the laser head is within a predetermined proximity to the limit.

8. The method of claim 7, wherein the activated mode is one of a plurality of modes, each mode having a crash protection tolerance.

9. The method of claim 8, wherein the at least two modes have distinct-crash protection tolerances.

10. The method of claim 7, wherein the tolerance for a mode includes zero distance between an object and a location relative to the head, whereby a surface of the device may contact an object during operation in the mode without generation of a signal to communicating a crash, and wherein operation in the mode continues without undesirable damage.

11. The method of claim 7, wherein the activated mode is a run, parked, teach, or hold mode.

12. The method of claim 7, wherein the mode of operation is a hold mode, and further comprising processing the workpiece with a laser beam during the hold mode of operation.

13. The method of claim 12, wherein processing the workpiece comprises forming a hole, cutting an edge, or welding.

14. The method of claim 7, wherein the head comprises a telescopic housing, and further comprising a step of controllably extending or retracting the head during the mode of operation.

15. The method of claim 3, wherein the laser head comprises a housing, a nozzle disposed within the housing, and a nozzle tip disposed within the nozzle having a sensor, and wherein: (a) the step of measuring comprises detecting a signal from the nozzle tip sensor; and (b) a step of generating signal comprises communicating a crash condition to a controller based on cooperation of the nozzle tip sensor and head.

16. The method of claim 7, wherein the laser head comprises a housing having first and second body portions, the first body portion being telescopic with the second body portion, the first body portion being translatable within the second body portion, and wherein a step of determining further comprises detecting a signal representative of an extended limit, retracted limit, or intermediate position of the telescopic housing between the limits.

17. The method of claim 7, wherein the mode is a parked mode and the predetermined minimum distance is in a range of about 3–6 millimeters.

18. The method of claim 7, wherein the predetermined minimum distance is in a range of about 0–0.1 millimeters.

19. The method of claim 7, wherein the predetermined minimum distance is in the range of about 0–0.5 millimeters.

20. The method of claim 7, further comprising the steps of:

activating a run mode of operation to track the surface of the workpiece in relation to changing topography and to process the workpiece with a laser beam, the run mode operation to occur in a second time interval separate from the first time interval;

detecting, during operation of the unit in the run mode, a position of the laser head relative to a travel limit; and generating, based upon the detected position relative to a limit, a signal to communicate a crash condition to a controller so that the operation of the unit is stopped if the laser head is within a predetermined proximity to a limit.

21. The method of claim 20, wherein tracking the workpiece is carried out with the distance sensor used in the step of measuring.

* * * * *